No. 698,831. Patented Apr. 29, 1902.
C. R. GABRIEL.
COUPLING FOR CANDLESTICKS, &c.
(Application filed Jan. 2, 1902.)
(No Model.)

WITNESSES:
Chas. H. Luther Jr.
Ada E. Fagerty.

INVENTOR:
Charles R. Gabriel
by Joseph H. Miller & Co.
ATTORNEYS.

UNITED STATES PATENT OFFICE.

CHARLES R. GABRIEL, OF PROVIDENCE, RHODE ISLAND, ASSIGNOR TO GORHAM MANUFACTURING COMPANY, OF PROVIDENCE, RHODE ISLAND.

COUPLING FOR CANDLESTICKS, &c.

SPECIFICATION forming part of Letters Patent No. 698,831, dated April 29, 1902.

Application filed January 2, 1902. Serial No. 87,987. (No model.)

*To all whom it may concern:*

Be it known that I, CHARLES R. GABRIEL, a citizen of the United States, residing at Providence, in the county of Providence and State of Rhode Island, have invented a new and useful Improvement in Couplings for Candlesticks or other Articles, of which the following is a specification.

In the arts many articles require to be inserted into sockets and supported in the same.

The object of this invention is to provide a coupling which will automatically adjust itself to variations in the diameter of the sockets, so that the articles provided with the improved coupling may be readily secured in sockets of varying diameter.

The invention consists in the peculiar and novel construction of the coupling, as will be more fully set forth hereinafter.

I have elected to illustrate my invention as applied to a candle-support.

Figure 1:
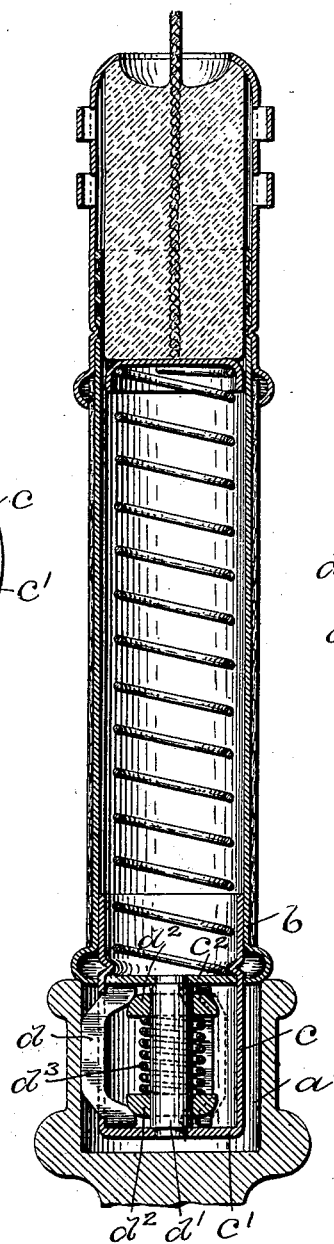
Figure 2:
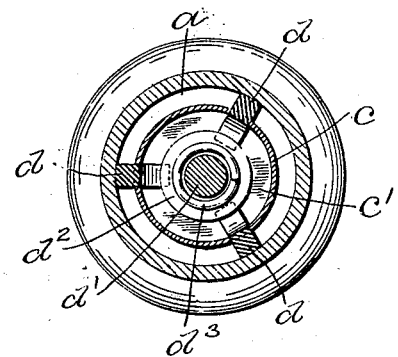
Figure 3:
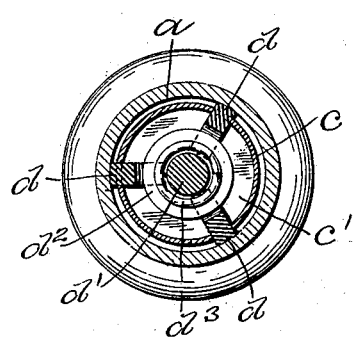

Figure 1 is a vertical sectional view of a tubular candle-support of the well-known spring type provided with my improved coupling inserted in a socket. Fig. 2 is a transverse sectional view of a socket of large diameter and the coupling. Fig. 3 is a transverse sectional view of a socket of smaller diameter and the same size coupling shown in Fig. 2.

In the drawings, $a$ indicates a socket, and $b$ an article to be secured in and supported by the socket. In the drawings the article $b$ is represented as a candle-support. To the end of the article the dowel $c$ is secured. The diameter of the dowel is less than the diameter of any one of the sockets in which the article is to be secured. The dowel has the disk $c'$ at one end and the disk $c^2$ in the other end. The cylindrical wall of the dowel is slotted longitudinally from a point near the disk $c^2$ to a point near the disk $c'$. In these slots the clamps $d$, having their ends curved obliquely inward, are inserted. The post $d'$ is secured at the opposite ends in the disks $c'$ and $c^2$. On the post the cam-rings $d^2$ $d^2$, fitting the post with a sliding fit, are held apart by the coiled spring $d^3$, inclosing the post. The cam-rings are forced by the coiled spring against the obliquely-curved ends of the clamps $d$, forcing the clamps outward until the ends of the clamps bear against the portions of the cylindrical wall of the dowel, as is shown in Fig. 1. When the article provided with my coupling is pushed into the socket, the obliquely-curved ends of the clamps $d$ facilitate the entrance of the coupling, and the force of the coiled spring $d^3$ acting on the cam-rings forces the clamps outward against the wall of the socket.

In applying my improved coupling to the tubular holder for candles, as shown in Fig. 1, I extend the dowel into the tube of the holder and secure it to the same.

Having thus described my invention, I claim as new and desire to secure by Letters Patent—

1. The combination with a tubular candlestick or similar article, of a tubular dowel, openings in the cylindrical wall of the dowel, clamps having radial movement in the openings, and spring-pressed cams acting on the clamps to hold them against the wall of the socket, as described.

2. In a coupling, the combination with a socket and the article to be secured in the socket, of a tubular dowel, longitudinal slots in the cylindrical wall of the dowel, disks in the opposits ends of the dowel, a central post, cam-rings on the post, a coiled spring bearing on the cam-disks, and radially-moving clamps operated by the spring-pressed cam-rings to bear on the wall of the socket, as described.

In testimony whereof I have signed my name to this specification in the presence of two subscribing witnesses.

CHAS. R. GABRIEL.

Witnesses:
  J. A. MILLER, Jr.,
  ADA E. HAGERTY.